Oct. 15, 1946. O. H. BANKER 2,409,236
METHOD OF MAKING ROLLER CAGES
Original Filed Dec. 26, 1941 2 Sheets-Sheet 1
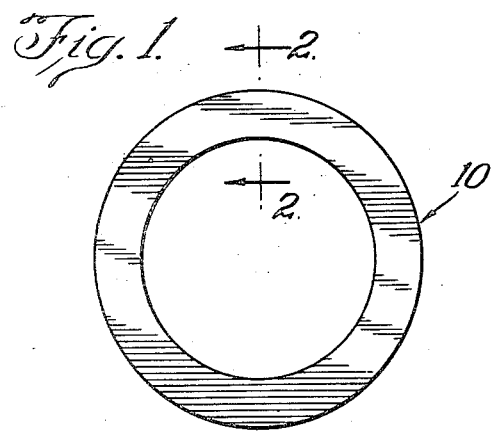
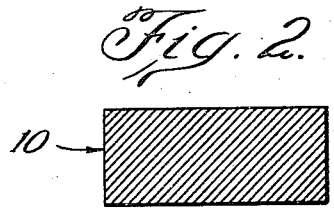
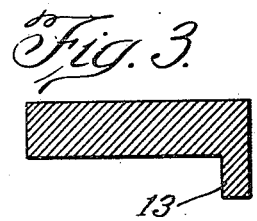
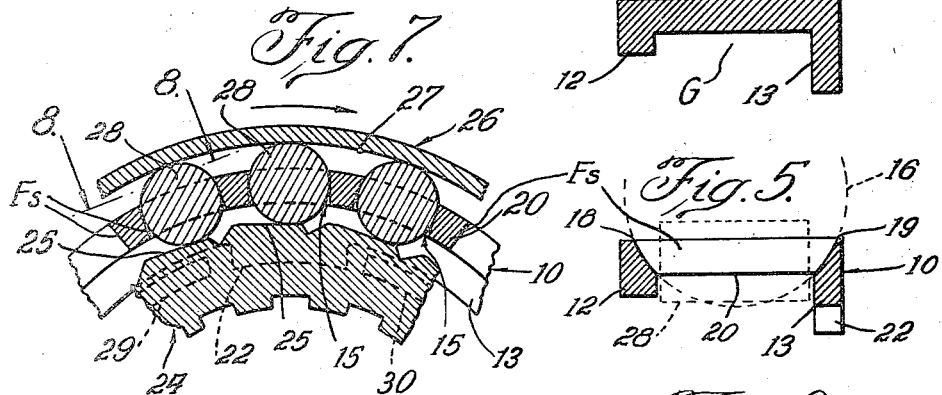
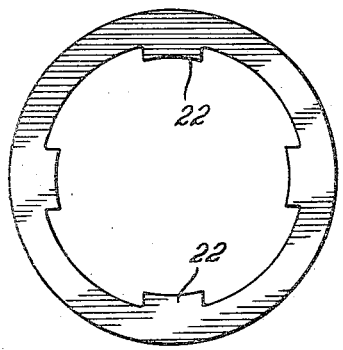
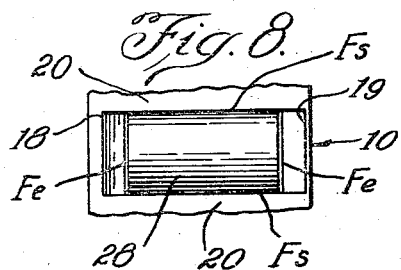
Inventor:
Oscar H. Banker Oct. 15, 1946.    O. H. BANKER    2,409,236
METHOD OF MAKING ROLLER CAGES
Original Filed Dec. 26, 1941    2 Sheets-Sheet 2
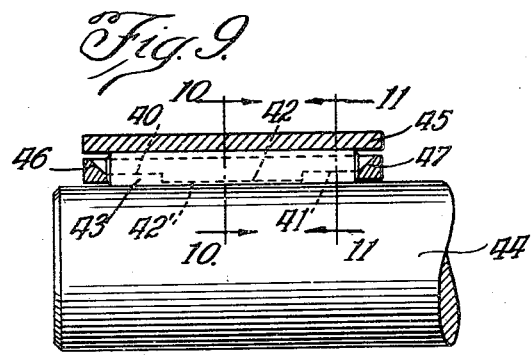
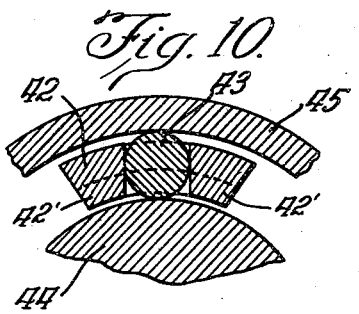
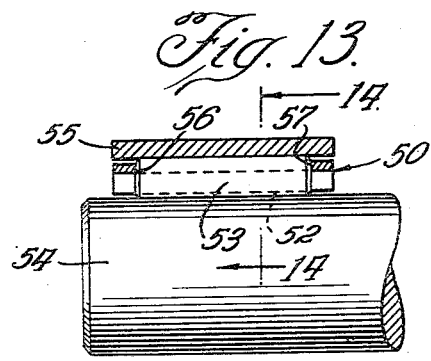
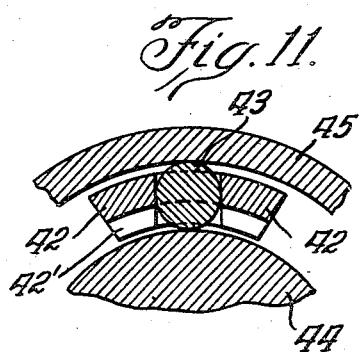
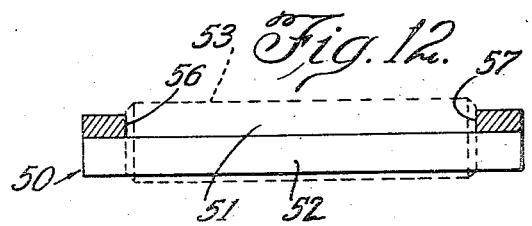
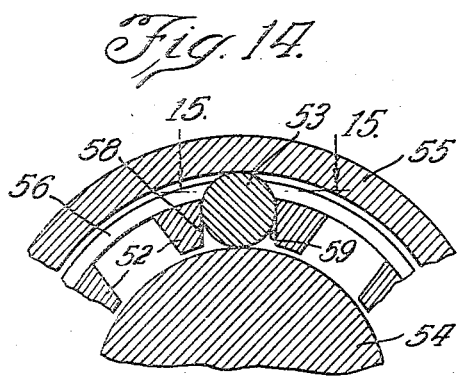
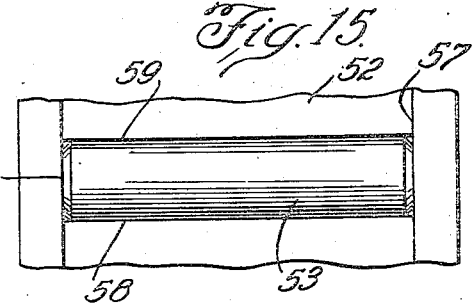
Inventor:
Oscar H. Banker
By:-
atty.

Patented Oct. 15, 1946

2,409,236

UNITED STATES PATENT OFFICE 2,409,236

METHOD OF MAKING ROLLER CAGES

Oscar H. Banker, Evanston, Ill.

Continuation of application Serial No. 424,438, December 26, 1941, which is a division of application Serial No. 297,439, October 2, 1939. This application April 5, 1944, Serial No. 529,567

6 Claims. (Cl. 29—148.4)

This application is a continuation of my pending application Serial No. 424,438 filed December 26, 1941, for Method of making a roller cage, which latter application is a division of parent application Serial No. 297,439, filed October 2, 1939, for Roller cage and method of making the same. The invention disclosed herein has to do with a cage for maintaining the spacing of bearing or clutch rollers or the like and relates more particularly to the method of making such a cage in a single integral unit.

It has been found that the conventional types of roller cages, which are fabricated from a number of parts, occasionally break during use and the parts have a tendency to become loosened so the rollers are no longer held with precision. That is, the sections at which the parts are joined by now known commercially practical methods are inherently weaker than the material from which they are formed, so that when these devices are subjected to the jars and stresses encountered in service they frequently become impaired at these points. Breakage is sometimes caused when a roller lodges tightly against solidified bearing lubricant and/or foreign matter accumulated therein.

This breakage or other impairment occurs in fabricated cages used for holding the friction elements or so-called rollers or over-running clutches as well as in such cages used in roller bearing units.

The present invention is particularly advantageous when applied to cages for closely spaced rollers of small diameter. In such a design of conventional structure the spacer or axially extending bars are necessarily thin in both their transverse dimensions, and are consequently critically weakened by the removal of material at their ends for receiving pins or other means for securing them to the cage rings. Others have endeavored to meet this problem by making the rollers hollow for receiving reinforcing pins which are then attached at their opposite ends to the cage end rings. This, however, is an expensive structure, and has the further disadvantage of diminishing the rollers' load capacity.

An important object of the present invention is to provide a new and practical method of making a one-piece roller cage which overcomes the aforementioned difficulties.

Another important object of the present invention is the provision of an improved method involving steps adapted to be performed by automatic machinery in the production of a one-piece roller cage.

Still another object of the invention is the provision of a novel process of making an improved one-piece roller cage, involving the steps of effecting intersecting cuts in adjacent radial zones of an annulus to form roller-receiving slots of which each has a pair of opposed flat faces for engaging substantially opposite circumferential sides of a roller and a pair of opposed flat faces for engaging the opposite ends of such roller.

These and other desirable objects encompassed by and inherent in the present invention will become apparent upon reading the following description with reference to the annexed two sheets of drawings, wherein:

Fig. 1 is an end view of an annular piece of metal stock from which any of the hereinafter described forms of roller cage may be conveniently formed by following the steps of this invention;

Fig. 2 is an axial sectional view taken on the line 2—2 of Fig. 1;

Figs. 3 to 5 are views taken similarly to Fig. 2 at respectively progressive stages in the process of treating the stock shown in Figs. 1 and 2 to form the first of said embodiments or devices;

Fig. 6 is an end view of the completed first device;

Fig. 7 is a fragmentary sectional view illustrating the first device as it may be assembled in an over-running clutch;

Fig. 8 is a fragmentary view taken on the line 8—8 of Fig. 7;

Fig. 9 is a sectional view of a roller bearing assembly employing a modified or second form of device capable of being made by the present process;

Figs. 10 and 11 are views taken respectively on the lines 10—10 and 11—11 in Fig. 9;

Fig. 12 is a view similar to Fig. 5 but illustrating a third form of the device adapted to be made by my new process;

Fig. 13 shows the device of Fig. 12 installed in a roller bearing assembly;

Fig. 14 is a view taken on the line 14—14 of Fig. 13; and

Fig. 15 is a view taken on the line 15—15 of Fig. 14.

The herein described processes of making the improved embodiments of roller cage device involve a series of machining operations by means of which portions of an annular metal ring 10, Figs. 1 and 2. are removed to leave a skeleton-like structure constituting a finished device. Although such a device is conveniently machined from a ring as 10 having a body rectangular in section, it is to be understood that such ring body may have other sectional shapes, and particularly the ring may be cast or otherwise formed to more nearly correspond to the finished device and thereby eliminate one or more of the initial steps, or substantially diminish the amount of material necessarily removed during these steps.

When the first form of the device is made from a ring of stock as that illustrated in Figs. 1 and 2, said ring may be turned in a lathe for removing material from an internal peripheral section until said ring has a cross section similar to that illustrated in Fig. 3. Additional material is removed from the inner periphery of the ring until it has a cross sectional configuration as that illustrated in Fig. 4. At this point in the process the ring will have a flange 12 at one end and a flange 13 of greater radial extent at its opposite end.

After the ring has been turned down to some such shape as illustrated in Fig. 4, it may be placed upon a suitable work holder where it is subjected to a plurality of milling cuts or the like to form roller-receiving slots 15; see Fig. 7. A milling wheel is schematically represented by the dotted line 16 in Fig. 5 in the position it would be relatively to the ring 10 at the end of a milling cut. The diameter of the milling wheel is so chosen as will enable it to make a cut entirely through the inner face of the bridge portion 17 of the ring without cutting through the material of the ring at its ends; that is, without cutting axially of the ring in either direction beyond points such as 18 and 19. This step is facilitated by the previous removal of material from the inner periphery of the ring.

Following each cut for effecting a roller-receiving slot 15, the work holder will be rotated or otherwise moved to bring an adjacent peripheral area of the ring into registry with the milling wheel preparatory to making a succeeding cut. Such movement of the work holder may be indexed and coordinated with an approach and retractive movement of the milling wheel so the work holder will be moved to bring a new section of the ring into registry with said wheel prior to each approach of said wheel toward the ring for cutting out the registered area. This action is continued until a series of slots have been formed about the entire circumferential periphery of the ring. Unremoved portions of material between the slots 15 constitute bars 20.

An examination of Figs. 5, 7 and 8 will reveal that the effective end faces Fe of the slots 15 are disposed in one radial zone of the ring upon sections of the opposed radial faces of the annular internal groove G, whereas the side faces Fs of said slots are disposed in an adjacent outer radial zone upon opposite sides of the bars 20. The hereinabove referred to flanges 12 and 13 become in effect, rings integral with such bars at their opposite ends.

Following the milling operation for forming the slots 15, the opposed surfaces of the bars 20 and the inner and opposed surfaces of the rings 12 and 13 may be polished. Other surfaces of the device may be likewise treated.

Subsequent to the forming of the flange or ring 13 as illustrated in Figs. 3 to 5, sections thereof may be removed to leave inwardly directed radial lugs 22. These lugs, in the present instance, are for limiting rotative movement of the cage relative to an internal actuator member 24 of an overrunning clutch, fragmentarily shown in Fig. 7.

Said actuator member of the overrunning clutch, into which the present cage is assembled as a part, is internally splined to enable it to fit non-rotatively upon a shaft or the like constituting a driving or driven part. A plurality of camming surfaces 25 are provided upon said actuator member. A friction ring 26 disposed coaxially with the actuator member 24 presents a circular surface 27 in opposed relation to the cam surfaces 25. Clutch rollers 28, corresponding in number with the cam surfaces 25, are disposed within the slots 15 of the present cage device, which is then carried into assembly with the parts 24 and 26 in a manner to place the rollers 28 respectively upon the cam surfaces 25. Such spacing of the rollers 28 is maintained by the cage. The cage lugs 22 are disposed between stop members as axially projecting lugs 29 and 30 on the actuator member 24 for limiting rotative movement of the cage relatively to said member.

In the operation of the device, assuming the outer ring 26 is connected with a driven part and that the internal member 24 is connected with a driving part, clockwise rotation of the member 24 will cause the rollers 28 to roll upwardly of the cam surfaces 25 and thereby become wedged therebetween and the inner periphery of the ring 26 wherefore driving force will be transmitted through the rollers and the ring 26 for driving the loaded part. If the member 24 were to be rotated in the opposite direction, counterclockwise, relatively to the ring 26, or, if the ring 26 were to be rotated clockwise relatively to the member 24, the clutch rollers 28 would be moved downwardly with respect to the inclined cam surfaces 25 and permit such relative counterclockwise rotation of the part 24 or relative clockwise rotation of the part 26.

Certain uses for roller bearing units require that the rollers shall be comparatively long, small in diameter and closely spaced. Under circumstances of this kind, the cage bars are necessarily long and of small cross sectional area, making it advisable to reinforce these bars. A second form of roller cage, shown in Figs. 9 to 11 as a part of a roller bearing assembly, includes bars that are so reinforced.

In making this second form of the device a ring, as that illustrated in Figs. 1 and 2, will first be given two internal circumferential cuts as those shown at 40 and 41 in Fig. 9. Such cuts 40 and 41 will leave an annular radially projecting portion 42. Thereafter, a series of milling cuts similar to those described with respect to Fig. 5 will be made for effecting the circumferentially spaced slots for receiving rollers as 43. The illustrated rollers 43 are bearing rollers which roll about a shaft 44 and the inner surfaces of a ring or race 45.

During operation of the roller bearing assembly shown in Fig. 9, if any roller should become clogged to resist movement whereby an unusual stress should be applied to any of the cage bars, the projecting portion 42' upon such bar would be pressed against the shaft 44 and thus offer support for said bar. Thus, in addition to the projections 42' providing greater strength because of increasing the cross sectional area of their bars, said sections provide a lateral support therefor when pressed against the shaft. The cuts taken at 40 and 41 may be only broad enough axially of the device to enable the milling wheel to cut completely through the ring at the points 46 and 47. When this practice is followed the projecting reinforcing and supporting portions 42' will be very long and have their greatest effect for reinforcing and supporting their bars.

The invention is also applicable to the making of a third type of cage shown in Figs. 12 to 15 where it is assembled as a part of a roller bearing unit. In making this type of cage a ring as that illustrated in Figs. 1 and 2, when placed in the lathe, is treated externally to form a groove 51. Thereafter, the ring is given a series of axial broaching cuts spaced circumferentially about its internal periphery to form spacer bars 52. These cuts are sufficiently deep to effect openings in the bottom of the groove 51 and thus provide roller pockets or slots for this cage 50. The bearing unit, Figs. 13, 14 and 15, with which the cage 50 is assembled includes roller bearings 53 disposed between inner and outer race members 54 and 55. In these figures it will be observed that the original cut taken in the external periphery of the ring leaves opposed faces 56 and 57 for engaging the ends of the roller bearings 53 to prevent their axial displacement. These faces are disposed in one radial zone of the device. The rollers 53 are maintained in their proper circumferential spacing by opposed faces as 58 and 59 upon the bars 52; see Figs 14 and 15, these faces being disposed in a radial zone inwardly of and adjacent to that containing said faces 56 and 57.

Here, as in the first two described forms of the device, the opposed faces as 56 and 57 at opposite ends of the roller slots and the faces as 58 and 59 at opposite sides of said slots are all formed by standard simple machining operations which leave clean, smooth surfaces intersecting in such a manner that no filing or other dressing or finishing operations are necessary. Each of the herein described steps employed in the making of the devices is especially suited to be performed entirely by automatic machine operations, wherefore the process leads to economical production. Moreover, these advantages are coupled with the further advantage that the new device made by this novel method possesses greater strength and wearing qualities.

While it is thought the invention and many of its attendant advantages will be understood from the above description together with the drawings in which various applications of the invention are shown for illustration, it will be apparent that the invention is applicable to the making of articles having different form, construction and arrangement of parts, and that the steps of this invention are susceptible of modification and rearrangement in the order of performance without departing from the spirit or scope of the invention or sacrificing all of its material advantages, the steps herein described being merely a preferred process performed according to the invention.

I claim:

1. The method of making a roller cage from a cylindrical ring, comprising the step of cutting within one cylindrical face and radial zone of said ring a groove having spaced-apart opposed faces disposed perpendicularly to the ring axis and for engaging the ends of a roller, and the further step of cutting in the opposite cylindrical face and an adjacent radial zone of the ring a groove intersecting the first groove and having spaced-apart opposed faces directed axially of the ring and for engaging substantially diametrically opposite sections upon the cylindrical surface of said roller.

2. The method of making a roller cage, comprising the step of cutting an annular groove within the inner periphery of a ring member by means of a scooping movement directed circumferentially of said member, and the further step of cutting a series of roller-receiving openings communicative with said groove by performing a scooping operation upon each of spaced-apart areas distributed circumferentially about the exterior periphery of said member, and said operations each entailing a scooping action directed axially of said member at varying radii with respect thereto.

3. The method of making a roller cage from a ring member having inner and outer peripheries, comprising the step of cutting an annular groove about one of such peripheries by means of a scooping action directed circumferentially of said ring member, and the further step of cutting a series of roller-receiving slots, communicative with said groove, by performing a scooping operation within each of respective areas circumferentially spaced about the outer periphery of said ring member, and each of the latter operations entailing a scooping action directed substantially axially of said ring member.

4. The method of making a roller cage, comprising the step of forming spaced annular recesses within the inner periphery of a cylindrical member respectively adjacent to its ends by a scooping action directed circumferentially of said cage, and the further step of forming a series of roller-receiving slots spaced circumferentially about said member and communicative between the outer periphery thereof and the inner periphery thereof in the bottoms of said recesses and in the portion between said recesses, and the step of forming each of said slots involving a scooping action directed substantially axially of said cage.

5. The method of making a roller cage, comprising the step of forming an annular recess within the outer periphery of a ring member by means of a scooping action directed circumferentially of said member to prepare opposed roller-slot end faces in one radial zone of said ring member, and the further step of forming a series of cut-away sections within each of respective areas circumferentially spaced about the inner periphery of said ring member, and each of the latter operations entailing a scooping action directed substantially axially of said ring member.

6. The method of making a roller cage, comprising the step of forming a cylindrical member with inner and outer peripheries and with opposite axially-spaced ends, removing material from a circumferential zone in the inner of such peripheries to form an annular groove extending thereabout, and then scooping away material within areas spaced circumferentially about the outer periphery of said member with arcuate scooping movements directed generally axially of the member at each area, said scooping movements having a progressive advancement axially of said member at each area as the material thereof is scooped away and reaching radially of said member from outer periphery in graduated depth decreasing as the ends of said member are approached to leave reinforcing stock at the member ends, and continuing said scooping movements at each area until their radial advancement is sufficiently deep between the ends of said member to intersect said groove and thus form roller-receiving pockets.

OSCAR H. BANKER.